UNITED STATES PATENT OFFICE.

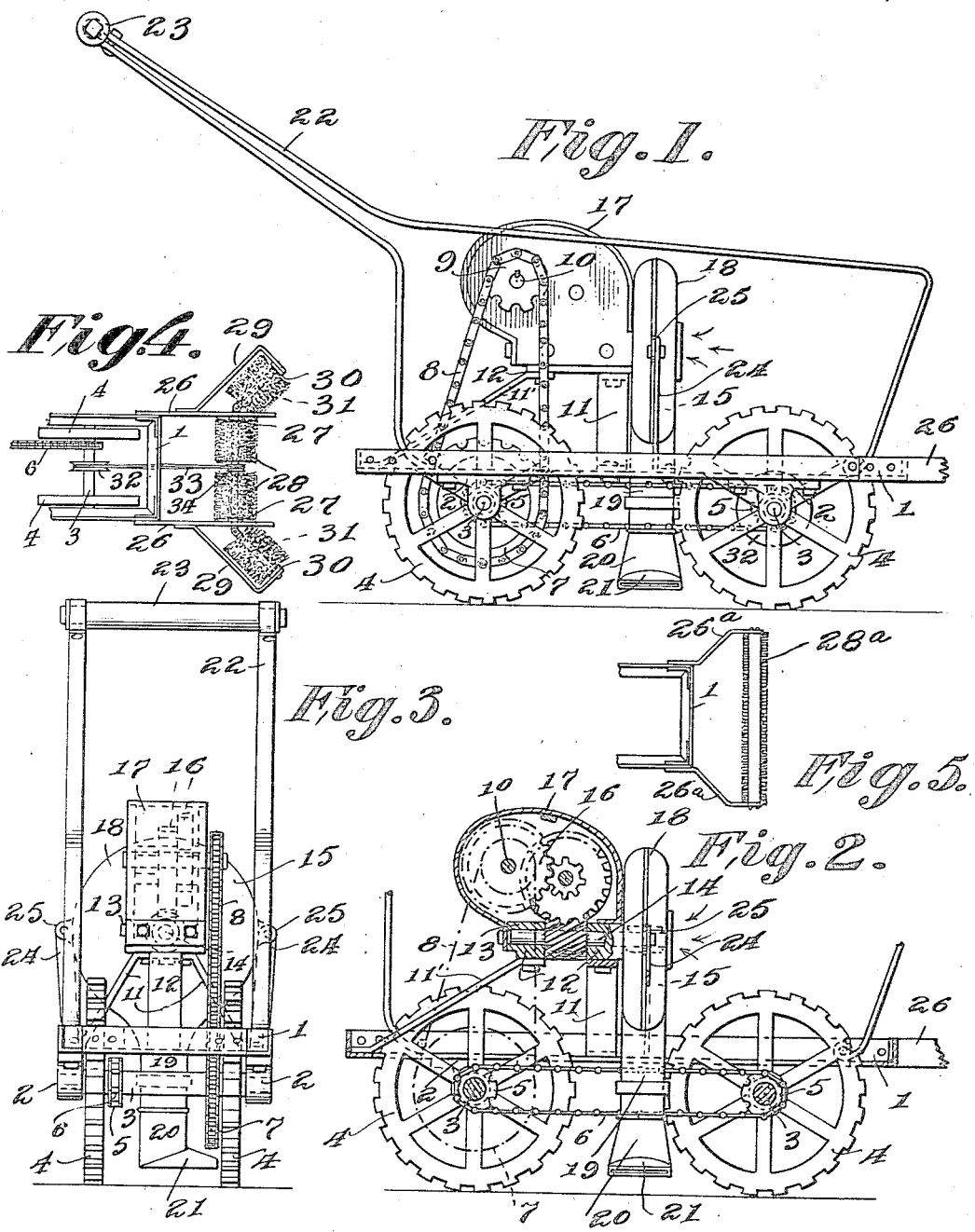

GEORGE S. HARRIS, OF LANETT, ALABAMA.

FLOOR-CLEANING MACHINE.

1,243,516.     Specification of Letters Patent.     Patented Oct. 16, 1917.

Application filed April 10, 1913. Serial No. 760,249.

*To all whom it may concern:*

Be it known that I, GEORGE S. HARRIS, a citizen of the United States, residing at Lanett, in the county of Chambers and State of Alabama, have invented certain new and useful Improvements in Floor-Cleaning Machines; and I do hereby declare the following to be a full, clear, and exact description of the invention, such as will enable others skilled in the art to which it appertains to make and use the same.

This invention relates to improvements in cleaning apparatus, and more particularly to a pneumatic sweeper.

The object in view is the provision of simple, cheap and efficient means for delivering an air blast for cleansing a floor in the path of the blast, the structure being especially adapted for use in cotton or other mills for removing fly or lint.

With this and further objects in view, as will in part hereinafter appear and in part become obvious, the invention comprises certain novel constructions, combinations and arrangements of parts as will be hereinafter specified and claimed.

In the accompanying drawing,—

Figure 1 is a view in side elevation of a structure embodying the features of the present invention, the forward brushes being broken away.

Fig. 2 is a longitudinal, vertical, central section therethrough.

Fig. 3 is an end view thereof.

Fig. 4 is a fragmentary, plan view showing the brushes.

Fig. 5 is a similar view of a modified form of brush.

The invention generally comprehends a carriage which is adapted to be manually manipulated, and to that end is provided with an appropriate handle and with supporting traction wheels, the wheels carrying a framework on which is mounted a fan or other suitable blower and gearing for actuating the fan, the gearing being geared to the traction wheels for supplying power to the fan when the carriage is moved. In advance of the forward traction wheels is arranged a broom for sweeping in advance of the carriage while the blower sweeps laterally of the carriage.

Referring specifically to the accompanying drawing, 1 indicates a preferably rectangular frame, of angle iron or other suitable material, mounted upon and fixed to bearing boxes 2, 2, for the journals of axle shafts 3, 3. To each shaft 3 is fixed a pair of supporting or traction wheels 4, each of said wheels being notched or otherwise provided at its periphery with traction increasing means. Each axle 3 is provided with a sprocket wheel 5 and the wheels 5 are connected by the sprocket chain 6 so that power is transmitted from one set of wheels to the other. A sprocket wheel 7 is fixed to one of the axles 3, preferably the rear axle, and is engaged by a sprocket chain 8 which extends thence upwardly and is passed about a sprocket wheel 9 fixed to a shaft 10.

Mounted on the frame 1 is a supporting stand consisting of inclined bars 11 and 11', forming the legs of the stand and having their upper portions connected with a plate 12 sustaining bearing sleeves 13 in which is journaled the shaft 14 of the fan or blower 15. A chain of gears 16 is arranged for transmitting motion from the shaft 10 to the shaft 14, the said chain of gears being preferably incased in a housing 17, which is also sustained by the said stand. The fan 15 is also inclosed by a housing or casing 18 which is fixed to and sustained by the stand and by the housing 17, the lower central portion of the housing 18 tapering downwardly gradually into a pendent discharge tube 19. Swiveled to the lower end portion of the tube 19, as by any suitable swivel joint 20, is a nozzle 21. The nozzle 21 may assume any of various forms but preferably consists of a tube pendent from the swivel and turned abruptly substantially at right angles into an oval or flattened horizontal discharge portion for directing the discharge substantially parallel with the floor on which the carriage is mounted, but sufficiently downwardly toward the floor to insure the moving of foreign substances along the floor in advance of the air blast from the nozzle.

It is to be observed that the swiveling of the nozzle enables its disposition at any desired angle relative to the line of movement of the carriage, and one preferred method of use of the apparatus consists in disposing the nozzle across the plane of the path of travel of the carriage so that when the carriage is moved back and forth the discharge blast is directed laterally relative to the carriage.

The carriage is provided with a suitable operating handle consisting preferably of a pair of side bars 22 connected by a cross bar or handle bar 23. Each side bar 22 consists of a rod having one end connected to the frame 1, at a rear portion thereof, and extending thence upwardly to substantially the level of the shaft 10, and being bent at this point and extending thence rearwardly and upwardly on an incline to the bar 23, the rod being bent about said bar and extending downwardly again parallel to the upwardly inclined portion substantially to the termination of such inclined portion, and thence extending forwardly on a very slight incline to a point above the forward portion of the frame 1, and being thence bent downwardly and extending to and having its front end fixed to the front portion of the frame 1. This form of handle provides a rigid firm connection capable of withstanding the stresses to which it must be subjected in the handling of the machine, and at the same time undue weight is avoided, as the handle is of relatively light material.

A supplemental or forwardly outstanding frame 26 is fixed to the forward end of frame 1, and a shaft 27 is journaled in the forward part of the frame 26, the frame being disposed for sustaining rotary brushes 28, 28 fixed to the shaft 27 and contacting with the floor in advance of the carriage. Lateral brackets 29 are fixed to the frame 26 and each has a shaft 30 journaled at its outer end in the outer terminal of the respective bracket, each shaft 30 carrying a brush 31 and being connected at its inner end by a universal joint with the respective adjacent end of shaft 27. Each brush 31 is preferably disposed with its axis at an incline or angle to the axis of the brushes 28, the incline being such as to cause the brushes 31 in operation to direct the substance being swept toward the central line in advance of brushes 28. A pulley 32 is fixed to the forward shaft 3 and is engaged by the cross belt 33 which engages a pulley 34 fixed to the shaft 27, so that power is transmitted from the forward shaft 3 to all of the brushes, and as the belt 33 is crossed the brushes will be rotated in a direction reverse to the direction of rotation of the traction wheels so as to make the sweeping action of the brushes effective.

It should be obvious that various forms of brushes or brooms may be used in advance of the carriage, and if preferred a simple straight broom may be utilized as indicated at 28$^a$ in Fig. 5, which is supported by the supplemental frame 26$^a$.

The present improved sweeping machine is, of course, of general application, but is particularly designed and adapted for use in cotton or woolen mills or similar places where the "fly" or other foreign substances collect beneath the machines. Machines are usually arranged in rows with aisles between the rows, and one preferred operation of the present improved sweeper consists in moving the same down successive aisles with the nozzle 21 delivered laterally. The result is that the fly or other foreign substances appearing in the particular aisle down which the carriage is moving will be swept by the advance broom or brushes, and the particular aisle in question will be thus cleaned, while, at the same time, the lateral air blast will blow the fly or other foreign substances from beneath the machines of the adjacent row out into the next aisle. Then, when the carriage is moved down that aisle the dislodged foreign substances and fly will be swept by the advance brushes and the air blast will act on the next row of machines as before, and so on throughout the mill. It is to be noted that the swivel for the nozzle 21 is especially useful in enabling the carriage to move in either direction along an aisle and at the same time direct the air blast beneath the particular desired row of machines.

The fan 15 and casing 18, so far as the present invention is concerned, may comprise any ordinary type of blower, within the obvious range of equivalents, and the casing 18 is supported against excessive vibration, in addition to the support afforded by the stand, by side links or upright bars 24, 24. The housing or casing of the blower is formed with laterally extending eyes 25, 25, and the links or uprights 24 are connected thereto by suitable bolts. The lower end of each upright 24 is riveted or otherwise suitably fixed to the respective side of the frame 1.

What I claim is:—

1. A pneumatic sweeper comprising a frame, front and rear traction wheels supporting the same, a blower sustained by the frame between the planes of the front and rear wheels, a discharge tube for the blower pendent therefrom substantially midway of the length of the frame, and a discharge nozzle swiveled to and pendent from the discharge tube beneath the frame.

2. A pneumatic sweeper comprising a frame, traction wheels supporting the frame, a stand carried by the frame, a rotary blower sustained by the stand, upstanding bars fixed to the sides of the frame and engaging portions of the blower for balancing the support thereof, gearing for transmitting motion from the traction wheels to the blower, a discharge tube for the blower pendent therefrom through the frame and between the planes of the traction wheels, and a nozzle swiveled to the lower end of the discharge tube and disposed to discharge substantially horizontally.

In testimony whereof I affix my signature in presence of two witnesses.

GEORGE S. HARRIS.

Witnesses:
B. L. VEAZEY,
W. L. LEATHERMOND.